March 16, 1926.
J. H. SCHEIBELER
1,576,677
WELL ROD AND PIPE COUPLING
Filed Jan. 17, 1923
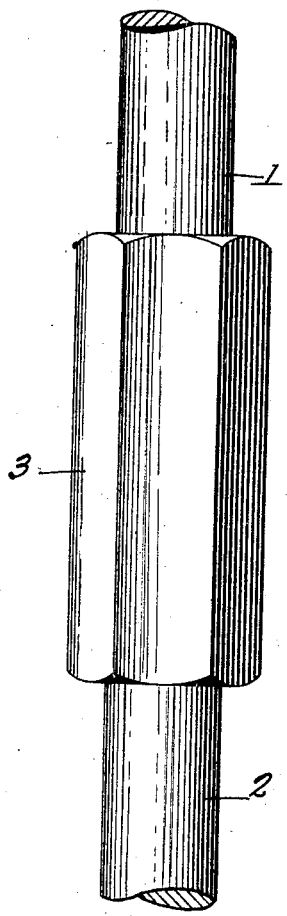
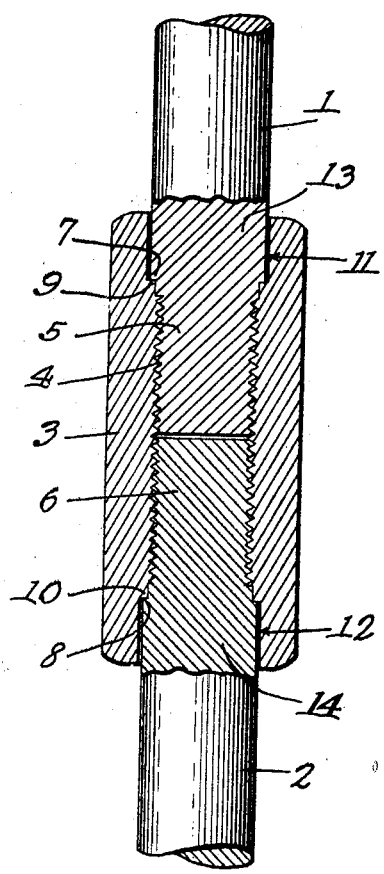
Inventor
J. H. Scheibeler
By Lester L. Sargent
Attorney Patented Mar. 16, 1926.

1,576,677

UNITED STATES PATENT OFFICE.

JOHN H. SCHEIBELER, OF NEBRASKA CITY, NEBRASKA, ASSIGNOR OF ONE-FOURTH TO ANDREW P. MORAN, OF NEBRASKA CITY, NEBRASKA.

WELL ROD AND PIPE COUPLING.

Application filed January 17, 1923. Serial No. 613,217.

*To all whom it may concern:*

Be it known that I, JOHN H. SCHEIBELER, a citizen of the United States, residing at Nebraska City, in the county of Otoe and State of Nebraska, have invented a new and useful Well Rod and Pipe Coupling, of which the following is a specification.

The object of my invention is to provide a novel water-tight, strong, and durable coupling for all kinds of well work, such as inside rods, pipes, etc. I attain these and other objects of my invention by means of the mechanism illustrated in the accompanying drawings, in which—

Figure 1 is a side elevation of the invention; and

Fig. 2 is a longitudinal section of same.

Like numerals indicate the same parts in the respective views.

Referring to the accompanying drawings, I provide a suitable hexagonal or similar coupling 3 having a continuous right hand threaded channel 4 extending through the coupling in which are secured the threaded ends 5 and 6 of the respective rods or pipes 1 and 2. The end portions of the coupling 3 are provided with chambered portions 11 and 12 to receive the un-threaded portions 13 and 14 of the coupled rods or pipes 1 and 2, respectively. I provide the coupling with annular interior portions 9 and 10, respectively, to butt against the annular shoulder portions 7 and 8 of the rods or pipes 1 and 2, whereby to form a water-tight connection that will prevent water from working in and rusting the threaded portions of the rods when the galvanizing has been removed by the cutting of the thread. The threading of the coupling permits of making a tight connection so that the device will practically constitute a solid rod, permitting of no jar or play upon the thread.

What I claim is:

A pump and well rod coupling comprising a coupling member having a longitudinally extending threaded channel, annular shoulders within the channel of the coupling member and spaced slightly from but in proximity to the ends of the threaded portion of the channel, coupled elements having threaded ends, said coupled elements each having annular shoulders, the shoulders of the coupled elements abutting against the shoulders of the coupling member within the walls of said member to form a water-tight joint.

JOHN H. SCHEIBELER.